US008522626B2

(12) United States Patent
Woodcock

(10) Patent No.: US 8,522,626 B2
(45) Date of Patent: Sep. 3, 2013

(54) CLAMPING FORCE SENSOR ASSEMBLY FOR MONITORING TRANSFORMER DEGRADATION

(75) Inventor: David J. Woodcock, Lyndonville, VT (US)

(73) Assignee: Weidmann Electrical Technology Inc., St. Johnsbury, VT (US)

( * ) Notice: Subject to any disclaimer, the term of this patent is extended or adjusted under 35 U.S.C. 154(b) by 178 days.

(21) Appl. No.: 13/133,362

(22) PCT Filed: Apr. 4, 2011

(86) PCT No.: PCT/US2011/028756
§ 371 (c)(1),
(2), (4) Date: Jun. 7, 2011

(87) PCT Pub. No.: WO2012/138317
PCT Pub. Date: Oct. 11, 2012

(65) Prior Publication Data
US 2012/0247229 A1    Oct. 4, 2012

(51) Int. Cl.
G01L 1/24    (2006.01)
(52) U.S. Cl.
USPC ..................................... 73/862.624
(58) Field of Classification Search
USPC ..................................... 73/862.624
See application file for complete search history.

(56) References Cited

U.S. PATENT DOCUMENTS 3,929,010 A    12/1975  Tjernstrom
4,009,461 A *   2/1977  Usry .............................. 336/197
6,718,268 B2    4/2004  Fantana et al.
6,874,224 B2    4/2005  Ahuja et al.
7,119,646 B2   10/2006  Golner et al.
7,187,453 B2    3/2007  Belleville
7,259,862 B2    8/2007  Duplain
7,265,847 B2    9/2007  Duplain et al.
7,516,651 B2    4/2009  Aubin et al.

(Continued)

FOREIGN PATENT DOCUMENTS

CA    2576978    3/2006
CA    2541028    9/2006

(Continued)

OTHER PUBLICATIONS

"The Effects on Winding Clamping Pressure Due to Changes in Moisture, Temperature and Insulation Age," by Tom Prevost, David J. Woodcock, Christoph Krause. pp. 1-18, Mar. 2000.

(Continued)

Primary Examiner — Lisa Caputo
Assistant Examiner — Octavia D. Hollington
(74) Attorney, Agent, or Firm — Downs Rachlin Martin PLLC

(57) ABSTRACT

A clamping force sensor assembly for a transformer includes at least one sensor disposed within a casing. The design and configuration of the sensor assembly is such that it accurately measures clamping force values placed on the windings, without adversely impacting the operation of the transformer and with the ability to continue operating under electrical and thermal changes within the transformer. The sensor assembly can include loading members that distribute the pressure evenly over the casing that contains the sensor. The output of the sensor can indicate to an operator the extent of pressure changes experienced by the transformer windings. The output can be coupled with a process by which the damage to or the possibility of failure of the transformer is readily evaluated.

4 Claims, 5 Drawing Sheets

(56) References Cited

U.S. PATENT DOCUMENTS

| | | |
|---|---|---|
| 7,689,071 B2 | 3/2010 | Belleville et al. |
| 7,697,797 B2 | 4/2010 | Chin et al. |
| 7,759,633 B2 | 7/2010 | Duplain et al. |
| 2008/0197977 A1 | 8/2008 | Wada et al. |

FOREIGN PATENT DOCUMENTS

| | | | |
|---|---|---|---|
| DE | 3536900 | * | 4/1987 |
| DE | 102007013466 | | 10/2008 |
| EP | 2120317 | * | 11/2009 |
| WO | 2006066393 | | 6/2006 |
| WO | 2007037756 | | 4/2007 |
| WO | 2009138370 | | 11/2009 |

OTHER PUBLICATIONS

"About Axial Clamping Force Monitoring At Power Transformer Windings During Their Active Lifetime," by Andrei Marinescu and Carmen Livia Ungureanu. Annals of the University of Craiova, Electrical Engineering Series, No. 32, 2008; ISSN 1842-4805.

"Transformer Winding Design—The Design and Performance of Circular Disc, Helical and Layer Windings for Power Transformer Applications," by David L. Harris, P.E. Minnesota Power Systems Conference, Nov. 3-5, 2009.

"Incipient Fault Detection in Transformers Using Fiber Optic Microbend Sensors," by Anup Jayaprakash Nambiar. Amrita School of Engineering Coimbatore, Tamil Nadu—641105 India (after 2006).

"Opsens White-Light Polarization Interferometry Technology," by Opsens Inc. Feb. 2009.

"Long-Life Fiber-Optic Pressure Sensor for Harsh Environment Applications," by Marek T. Wlodarczyk, Tom Poorman, Jacob Arnold and Terry Coleman. Optrand, Inc. Feb. 2001.

"Newly Developed Method for On-Line Monitoring of Oil Dielectric Breakdown Strength," by Tim Cargol. http://www.elp.com/index/display/article-display/301630/articles/utility-products/volome-3/issue-8/product-focus/preventive-maintenance. Aug. 2006.

"HV Power Transformer Direct Monitoring of Windings Axial Clamping Forces," by Andrei Marinescu, Ion Burciu, and Ion Patru. ICEMT Research-Development and Testing National Institute for Electrical Engineering, Craiova, 200515, Romania. Apr. 2006.

PCT International Search Report and Written Opinion dated Jan. 24, 2012, in related International Application No. PCT/US2011/028756 filed in the name of Weidmann Electrical Technology, Inc.

\* cited by examiner

CLAMPING FORCE SENSOR ASSEMBLY FOR MONITORING TRANSFORMER DEGRADATION

FIELD OF THE INVENTION

The present invention generally relates to the field of transformers. In particular, the present invention is directed to a clamping force sensor assembly for monitoring transformer degradation.

BACKGROUND

Power transformers use rigid clamping systems to compress transformer windings to a specified preload value so as to mitigate winding displacement during a fault. After manufacture, however, the pressure on the transformer windings typically decreases because of changes that occur in the materials used to construct the transformer. Specifically, degradation of cellulose insulation spacers, placed between windings or sets of windings in the transformer, generally occurs over time as a result of moisture, temperature, and fault-induced mechanical stresses. These factors can reduce the transformers' ability to withstand short circuit events. Although typically short in duration, short circuit faults can result in the application of high axial and radial forces in the winding, resulting in a decreased ability for the transformer to withstand future stress. To compensate for the altered cellulose insulation geometry and the corresponding decrease in pressure on the transformer windings, the clamping system may be re-tightened during periodic servicing of the transformer. However, because the operating history of the transformer is largely unknown, the scheduled maintenance may occur too late, resulting in catastrophic failure and electricity distribution problems. Alternatively, the maintenance may be performed too early, resulting in excess maintenance costs.

SUMMARY OF THE DISCLOSURE

In an embodiment, a transformer of the present disclosure comprises a clamped winding assembly including: first and second end blocks disposed in spaced, opposing relationship; at least one winding disposed between the first and second end blocks; a plurality of insulating members disposed between the first and second end blocks; a clamping assembly for urging the first and second end blocks toward one another so that the end blocks apply a compressive force to the at least one winding and the plurality of insulating members; and a load sensing member including a fiber optic sensor, the load sensing member disposed adjacent one of (i) the at least one winding and (ii) the at least one of the plurality of insulating members so as to be subjected to the compressive force, wherein the load sensing member provides an output signal containing information regarding the magnitude of the compressive force.

In another embodiment, a clamping force sensor is described, the clamping for sensor for use in a transformer having a clamping assembly including first and second end blocks, a plurality of windings, and a plurality of insulating members having a first compressibility, the first and second end blocks, plurality of windings, and plurality of insulating members being arranged such that a compressive force can be applied to compress the clamping assembly along an axis traveling through the first and second end blocks, the plurality of windings, and the plurality of insulating members, the clamping force sensor comprising a housing defining a chamber, wherein the housing has a first height substantially the same as that of one or more of the plurality of insulating members within the clamping assembly, further where the housing has a second compressibility that is less than the first compressibility; and a fiber optic sensor coupled to the chamber.

In yet another embodiment, the present disclosure includes a clamping force sensor for replacing one or more of a plurality of insulating members within a transformer, wherein each of the plurality of insulating members has a first width and is capable of transmitting a compressive force substantially uniformly across the first width, the clamping force sensor comprising: a housing defining a chamber, wherein the housing has a second width that is about equal to the first width such that the housing substantially uniformly transmits the compressive force to at least one of the plurality of insulating members; and a fiber optic sensor positioned within the chamber so as to determine changes in the shape of the chamber, wherein the fiber optic sensor transmits an output signal representative of the changes in shape of the chamber.

Another aspect of the present disclosure is a method of determining a real time compression of windings within a transformer comprising: measuring an initial compression force exerted on a clamping assembly with a clamping force sensor installed within the clamping assembly; determining a difference in compression force from the initial compression force; and indicating a status of the clamping assembly based on the difference in compression force.

Yet another aspect of the present disclosure is a transformer monitoring system comprising a clamped winding assembly compressed by a compression force, the clamped winding assembly including: a plurality of insulating members radially arranged on a plurality of planes within the clamped winding assembly; and a load sensing member having a fiber optic sensor, the load sensing member disposed adjacent at least one of the plurality of insulating members so as to be subjected to the compressive force, wherein the load sensing member provides an output signal containing information regarding the magnitude of the compressive force; and a controller coupled to the load sensing member and configured to: receive the output signal; compare the information to an alert trigger; determining a status of the clamped winding assembly based on the comparison.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
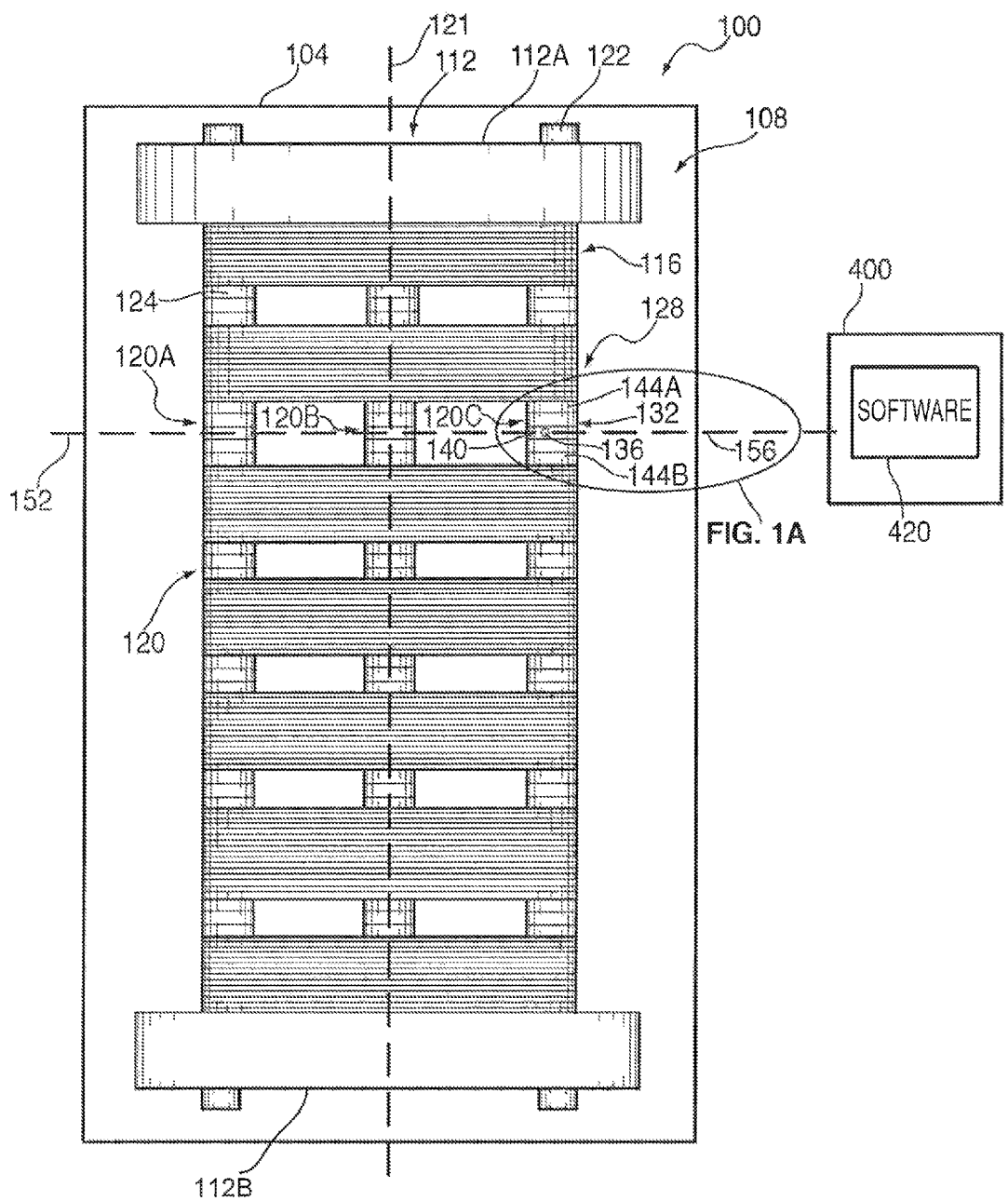
FIG. 1 is a side elevation schematic view of a portion of a transformer contained within a transformer tank shown in cross-section according to an embodiment of the present invention.
Figure 1A:
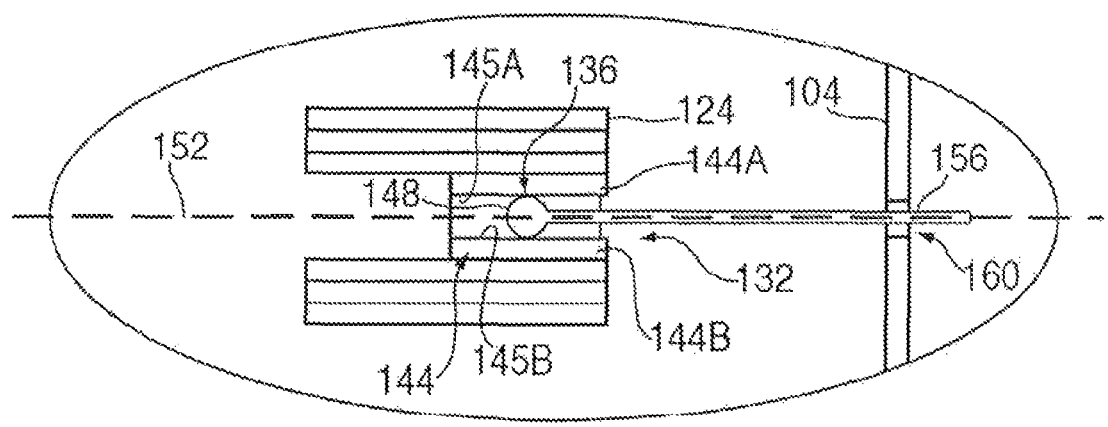
FIG. 1A is a side elevation schematic view of a portion of the transformer shown in FIG. 1, showing some internal components of the transformer.

Referring now to the drawings, FIGS. 1 and 1A illustrate a portion of an exemplary transformer 100 in accordance with certain aspects of the present invention. Generally, transformer 100 is a device for transforming power from a first voltage to a second voltage. In the case of "step-up" transformers, the second voltage is higher than the first voltage, and in the case of "step-down" transformers, the second voltage is lower than the first voltage. Typically, at least some of the components within transformer 100 are clamped together under a predetermined amount of force in order to stabilize the components during the service life of the transformer. As discussed more fully below, transformer 100 includes the components necessary to directly measure and electronically communicate to a utility or other entity a sensed reduction or increase in the clamping pressure placed on components of the transformer along its longitudinal axis. This information may be used to determine where transformer 100 is along its life-cycle, its current and past operating experiences, and if precautionary or corrective actions should be taken in a way that minimizes operational risk, avoids costs associated with a forced power outages, and increases the useful life of the transformer.

As shown in FIG. 1, exemplary transformer 100 includes a transformer tank 104, into which a winding assembly 108 is positioned. Transformer tank 104 is typically a water-tight container that, in certain embodiments of transformer 100, holds a liquid (not shown), such as mineral oil, suitable for dissipating heat generated during the operation of the transformer and mitigating water migration toward winding assembly 108.

Winding assembly 108 includes a pair of end blocks 112, i.e., end blocks 112A-B, with a plurality of windings 116 and a plurality of insulation assemblies 120 disposed between the end blocks. End blocks 112A-B are positioned in opposing relationship and are sized and configured to evenly distribute a clamping force from clamping assembly 122 (discussed more fully below) along longitudinal axis 121 of transformer 100. Windings 116 are typically formed around at least a portion of a magnetic core (not shown) and include multiple turns of a metal conductor, such as copper or aluminum. Each winding 116 may be wrapped around the magnetic core in a circular disc, helical, or layered pattern, or other wrapping pattern known in the art. Each winding 116 may be spaced apart by one or more radially arranged and circumferentially spaced insulation assemblies 120.

Insulation assemblies 120 may include one or more insulation plates 124 stacked on top of one another. Insulation assemblies 120 are sized and configured so as aid in the distribution of the clamping force from end block 112A, through windings 116, to end block 112B. Insulation assemblies 120 also provide dielectric distance between windings 116 to prevent short circuits, to maintain the mechanical integrity of winding assembly 108 during random (non-spontaneous) short circuit events and due to spontaneous degradation of the spacer insulation assemblies that is accelerated by influences such as heat, moisture, and oxygen ingress over time, and to provide a path between the windings that allows a sufficient amount of oil to circulate and remove heat from the windings. Insulation assemblies 120 are typically spaced equidistantly around the circumference of windings 116, extending radially from the center of transformer 100. In the exemplary transformer 100 of FIG. 1, six insulation assemblies 120 are located between each of windings 116 and are spaced about 60 degrees apart (FIG. 1 shows three of these insulation assemblies, i.e., assemblies 120A, 120B and 120C). As will be understood by persons of ordinary skill in the art, the number and positioning of insulation assemblies 120 may be chosen so as to appropriately distribute the clamping force throughout winding assembly 108

Insulation plates 124 are often constructed of cellulose, and are typically capable of absorbing oil when placed in an oil bath. Insulation plates 124 may also be a fiber composite having a combination of fibrous reinforcement, aramid fibers, polymers, and additives, which may give the insulation plates superior resistance to corrosion, chemicals, and high temperatures. In one embodiment, each insulation assembly 120 includes more than about 12 insulation plates 124. In another embodiment, each insulation assembly 120 includes less than about 16 insulation plates 124. In yet another embodiment, insulation assembly 120 includes a number of insulation plates 124 that is sufficient in number to prevent short circuiting of transformer 100 during a fault event within an expected range.

Referring now to FIGS. 1 and 1A, exemplary transformer 100 also includes at least one force monitoring system 128 (described more fully below in reference to FIGS. 3 and 4) including a sensor assembly 132, which takes the place of one or more of the plurality of insulation plates 124 in insulation assemblies 120. In an exemplary embodiment, sensor assembly 132 includes a sensor 136 (described more fully below), disposed within a casing 140, which is surrounded by a pair of load members 144, e.g., 144A-B (best seen in FIG. 1A). In this embodiment, casing 140 has a configuration that is selected, and is formed from, the same or similar materials as insulation plates 124 it replaces, so as to retain the overall compression or expansion characteristics of the totality of insulation plates 124 throughout transformer 100. In other embodiments, it may be desirable to provide casing 140 with compression characteristics that differ somewhat from that of insulation plates 124. An exemplary casing 140 is sized and configured so as to preclude the introduction of stress concentration in a portion of winding assembly 108. In addition, an exemplary casing 140 is designed and configured to avoid the use of materials or adhesives that in use may give rise to the possibility of voids or inconsistencies in the casing, thereby altering the compression characteristics of insulation plates 124.

Load members 144A and 144B are sized and configured to provide substantially uniform loading on casing 140. The inclusion of sensor 136 within casing 140 might, without load members 144A-B, produce a localized high-load region immediately adjacent lower-load regions, which could result in compression creep during the useful life of exemplary transformer 100. Load members 144A-B, when used, may be constructed of relatively incompressible materials, such as glasses or ceramics, that have dielectric properties suitable for inclusion with transformer 100. As shown in FIG. 1A, members 144A and 144B may include, respectively, substantially planar contact surfaces 145A and 145B, which may be sized and configured to uniformly distribute pressure on casing 140. As with casing 140, load members 144A-B are typically made with materials or adhesives that, in use, do not give rise to of voids or inconsistencies in the load members, including in their respective surfaces 145A and 145B.

Load members 144A-B, together with casing 140 positioned between the load members, forms a housing 146 that, in one embodiment, is less compressible than insulation plates 124. In this embodiment, casing 140 defines a chamber in housing 146 for receiving sensor 136. Housing 146 may be positioned at various locations between end plates 112A-B. As illustrated in FIGS. 1 and 1A, housing 146 may be positioned in a stack of insulation plates 124. Housing may have a thickness equal to that of one insulation plate 124 in the stack, or may have a thickness equivalent to several insulation plates, as illustrated in FIGS. 1 and 1A. In some embodiments, it will be desirable to select the thickness, width and length of housing 146 to be substantially the same as that of an insulation plate 124. In other embodiments, it may be desirable to make the thickness of housing 146 substantially the same as the thickness of an insulation plate 124, but the width or length somewhat greater than or less than comparable dimensions of an insulation plate.

Sensor 136 is designed to measure the clamping force exerted on winding assembly 116 when installed in a transformer, such as transformer 100. Sensor 136 is selected to be mechanically, thermally, and dielectrically compatible with the other components in winding assembly 108 to that it is able to function under electrical and temperature conditions typically encountered in a transformer 100. For example, in the exemplary embodiment of transformer 100 described above, sensor 136 will function while immersed in the liquid contained inside transformer tank 104. Additionally, sensor 136 is designed to function under temperatures expected during the useful life of the transformer as well as during electrical faults. Sensor 136 provides an output signal that contains information regarding the magnitude of the clamping force to which the sensor is subjected. Depending on the nature of the sensor used, the output signal from sensor 136 may be analog or digital, and may be an electrical, optical, magnetic or other signal type.

In an exemplary embodiment, and with reference to FIG. 1A, sensor 136 may be a fiber optic sensor 148. Fiber optic sensor 148 is capable of accurately measuring changes in the force applied to windings 116 by measuring the changes of inputted light (such as intensity, phase, polarization, interferometric, travel distance, or spectrum) within casing 140. Fiber optic sensor 148 may use one or multiple optical fibers positioned within casing 140 to measure pressure changes in the preload force applied to winding assembly 108. Fiber optic sensor 148 is typically made of at least two parts, a fiber optic transducer (not shown), sometimes referred to as a the fiber optic probe or the fiber optic probe, and a signal conditioner (not shown). The fiber optic transducer contains an optical device that is sensitive to the physical magnitude of the pressure being exerted on casing 140. The signal conditioner has a plurality of functions. It serves to inject light into the optical fiber, receive the modified light signal returned by the optical fiber, and may process the modified light signal and convert the results into a pressure measurement or alternatively, a pressure difference from a reference pressure. Fiber optic sensor 148 is capable of measuring the intensity of the reflected light inside casing 140, by measuring changes in the light path length, or measuring other light characteristics mentioned above, which can be referenced so as to be proportional to the pressure induced deflections of the casing 140, thereby indicating the actual pressure on the casing. Casing 140, in this scenario, has the capability to reflect light for measurement by fiber optic sensor 148 or may contain a diaphragm (not shown) suitable for use with the fiber optic sensor. In one embodiment, changes to the dimensions of casing 140 results in changes in the optical signal transmitted from a sending fiber to a receiving fiber upon reflection from the casing 140, the changes are representative of a pressure change upon the casing. Fiber optic sensor 148 can be connected to a computer system through a connection cable 156 that extends through a sealed aperture 160 in transformer tank 104.

Returning to FIG. 1, a fiber optic sensor 148 may be included within one or more of insulation assemblies 120 that are located on the same plane, e.g., plane 152, within transformer 100. For example, in an embodiment, a fiber optic sensor 148 may be embedded in each of insulation assemblies 120A-C that are spaced equidistantly from each other on plane 152. Each fiber optic sensor 148 measures the force at its radial location and an average measured loading force can be derived by a computer system (described in more detail below) and provided to the operator or each location can be provided to the operator individually. In this embodiment, fiber optic sensors 148 in addition to identifying a lowering of the clamping force on the windings, can assist in the determination as to whether one or more winding has shifted during a short circuit event. For example, if, after a short circuit event, the pressure measurement provided by one or more fiber optic sensors 148 is greater in one area of plane 152 than in others, that would indicate a non-uniform shift in windings 116. This non-uniform shift can be conveyed to an operator for assessment. The inclusion of sensor 136 permits a number of possible diagnostic measurements to be performed on transformer 100, before and during its service. For example, sensor 136 may be capable of, among other things: a) confirming the preload pressure at the transformer manufacturer, b) monitoring the preload pressure during transport to the installation site, c) confirming the preload pressure at the installation site, d) confirming the preload pressure from phase to phase within the transformer, e) confirming the preload pressure during start-up of the transformer, f) confirming the ramp-up rate on the preload pressure limit, g) tracking and charting changes in preload pressure reduction, h) identifying changes in preload pressure caused by short circuit events, i) measuring the magnitude of a short circuit experienced by the transformer, j) forecasting risk of failure for transformer, k) advising operators to repair the transformer, l) tracking the number of short circuit events, m) determining a dry out minimum for the transformer, or n) resetting the preload pressure during transformer maintenance operations. Additionally, although sensor assembly 132 is shown between two windings 116 (FIGS. 1 and 1A), the sensor assembly (with or without load members 144) may be interposed between a winding and one of end plates 112.

In alternative embodiments, transformer 100 may include additional sensors (not shown), in combination with sensor assembly 132, that take the form of a thin film strain gage, a metallic load cell, or a piezo resistive foam. Although the aforementioned sensors may have limited applicability within the winding assembly 108 because the sensors may be dielectrically unacceptable or may disrupt the electrical field in the winding assembly, these alternative sensors can be used proximate the end plates 112—outside of the electrical field—and thereby provide additional information when combined with sensor assembly 132.

In use, sensor assembly 132 provides timely and actionable information related to the condition of the winding assembly 108 and therefore the condition of transformer 100. It is understood that while in some embodiments, the output of sensor assembly 132 would be reviewed and acted upon solely based on the information it provided (as described more fully below), in alterative embodiments, the information received from the sensor assembly may be combined with other measurements, such as, but not limited to winding temperature, oil temperature, vibration, and partial discharge inception level.

Figure 2A:
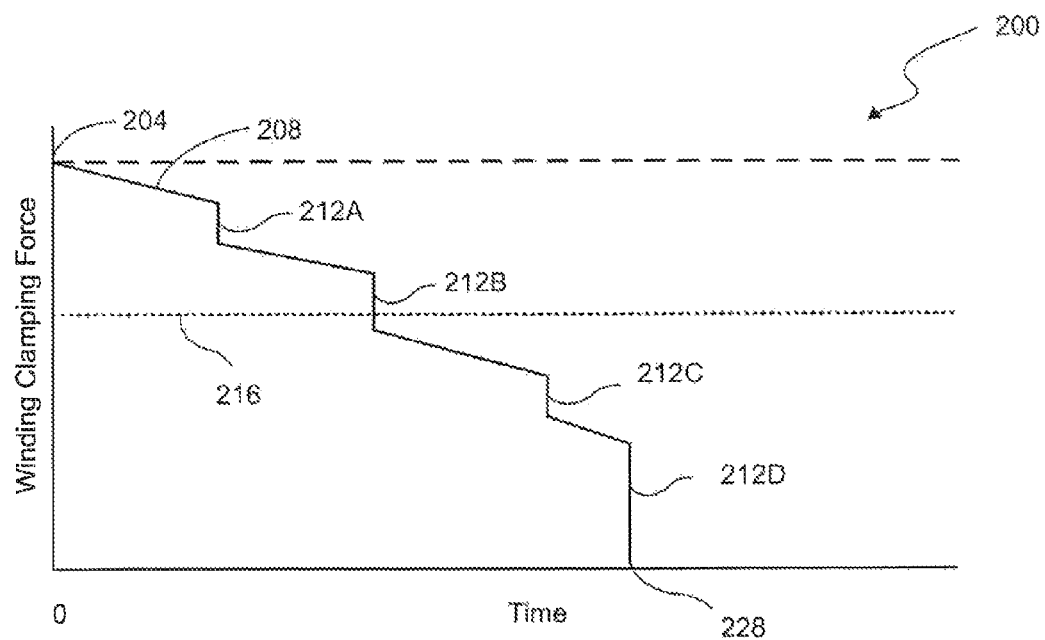
FIG. 2A is a chart exemplifying an operating life-cycle for a transformer according to an embodiment of the present invention.

Turning now to FIG. 2A, chart 200 displays the typical changes in winding clamp force over time for a transformer, such as transformer 100. As mentioned previously, upon assembly of the components of a transformer, a preload clamping force is applied, which is represented by preload value 204 at time equal 0. Once the transformer is placed into service, the transformer materials, and specifically the insulating materials, begin to degrade. The degradation results in a decrease in clamping force on the transformer windings and is represented by clamp force line 208. In general, clamp force line 208 can have a relatively constant slope throughout the life of the transformer. However, steep declines in clamping force result from short circuits events 212A-D caused by events typically, but not exclusively, external to the transformer. For example, animal intrusion, lightning, trees falling on power lines, etc., may cause a fault on the electrical system that causes a short circuit event within transformer 100, such as short circuit event 212A. The magnitude and duration of the fault (and hence the level of damage to transformer 100) is governed, at least in part, by the electrical system's impedance, the location of fault, and the ability of the electrical system to recovery from the fault. Short circuit events 212 can vary in severity and in number, thus larger or smaller decreases in the clamping force on the transformer windings can occur than are shown in chart 200.

Over time, the clamping force on the transformer windings decreases to below a minimum clamping force threshold 216. Minimum clamping threshold 216 is a predetermined clamping force value at which point the ability of the transformer to withstand short circuit events and remain in service is considerably diminished. In the exemplary transformer life-cycle shown in chart 200, the transformer is able to continue to provide service after short circuit event 212C, but fails upon experiencing short circuit event 212D.

Figure 2B:
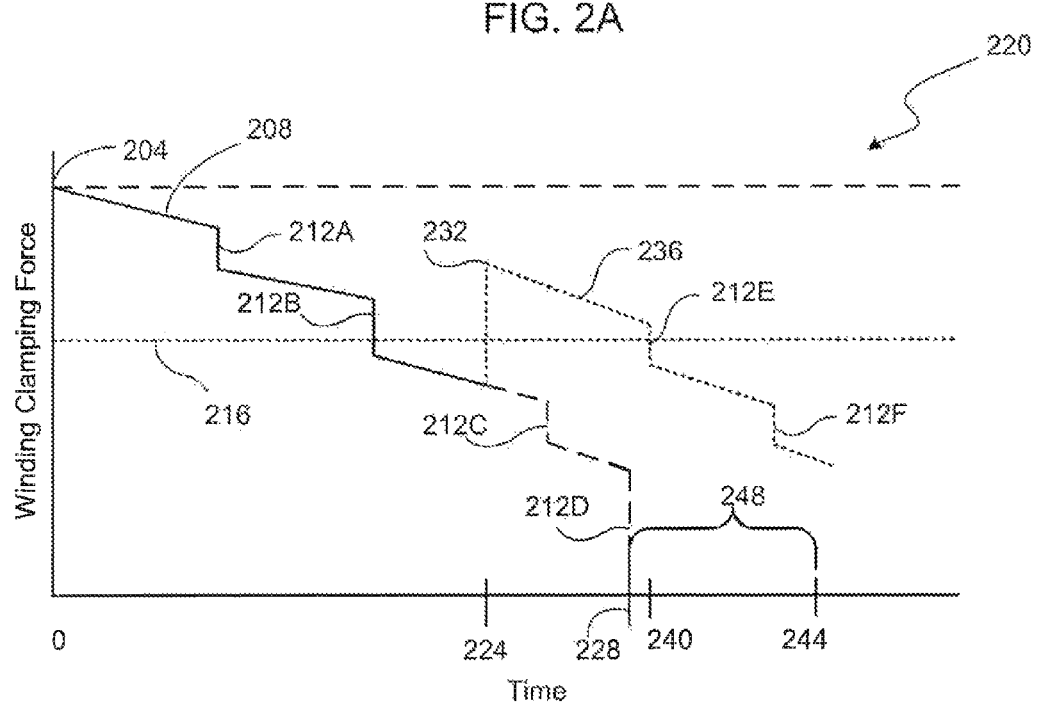
FIG. 2B is a chart similar to the one in FIG. 2A, except that it depicts the operating life-cycle for a transformer after re-tightening.

FIG. 2B shows a chart 220 that includes a retighten time 224. Retightening, also referred to as reclamping or reloading, the transformer windings at retighten time 224 aids in extending the service life of the transformer because the clamping force applied to the transformer windings is increased to above the minimum clamping value 216. For a prior art transformer, retighten time 224 would be determined based primarily on length of time the transformer has been in service and possibly some information related to the known operating conditions for the transformer. However, as the time at which clamp force line 208 crosses the minimum clamping threshold 216 varies from transformer to transformer because of, among other things, the daily loading cycle, magnitude of the loading, environmental conditions, the severity of short circuits, and the number of short circuits, the ability to know the appropriate time to retighten the transformer windings is valuable information for appropriately maintaining the transformer. As noted above, if the retightening is not done soon enough, catastrophic failure can occur at failure time 228. With the inclusion of a sensor assembly, such as sensor assembly 132, which can provide real-time information regarding the clamping pressure on the transformer windings, an operator may readily determine when the clamping force drops below minimum clamping threshold 216. In FIG. 2B, at retighten time 224, which can occur before, contemporaneously with, or sometime after the clamping force drops below minimum clamping threshold 216, the transformer is removed from service, the clamping force on the transformer windings is increased, and the transformer is placed back into service. As shown, the reload value 232 associated with retighten time 224 may not be as high as preload value 204 because of the deterioration of the insulation materials.

After retightening, degradation of the insulation materials continues along reload value line 236, which again crosses minimum clamping force threshold 216 at a time 240 after, for example, undergoing short circuit event 212E. Retightening may be attempted again or the transformer may be removed from service at time 244, prior to failure thus preventing disruptions in service. Notably, the service life of the transformer has been extended by an extension time 248, shown in FIG. 2B as the difference between time 244 and time 228 (shown as a dotted line extension of clamp force line 208). As before, in prior art transformers, the choice to remove a transformer from service is largely based on the amount of time the transformer has been in service or an operator can wait until the transformer fails so as to extract all of the useful life from the transformer. However, a transformer built in accordance with the present disclosure and thus including a sensor assembly, such as sensor assembly 132, may be monitored and proactively removed at an appropriate time so as to minimize disturbances to power distribution caused by transformer failure and to reduce consequential costs, such as, but not limited to, the cost of lost power, penalties and system disruptions, as well as potential damages arising out of catastrophic failure such as, but not limited to, fire, oil spills, and injury to maintenance personnel.

Figure 3:
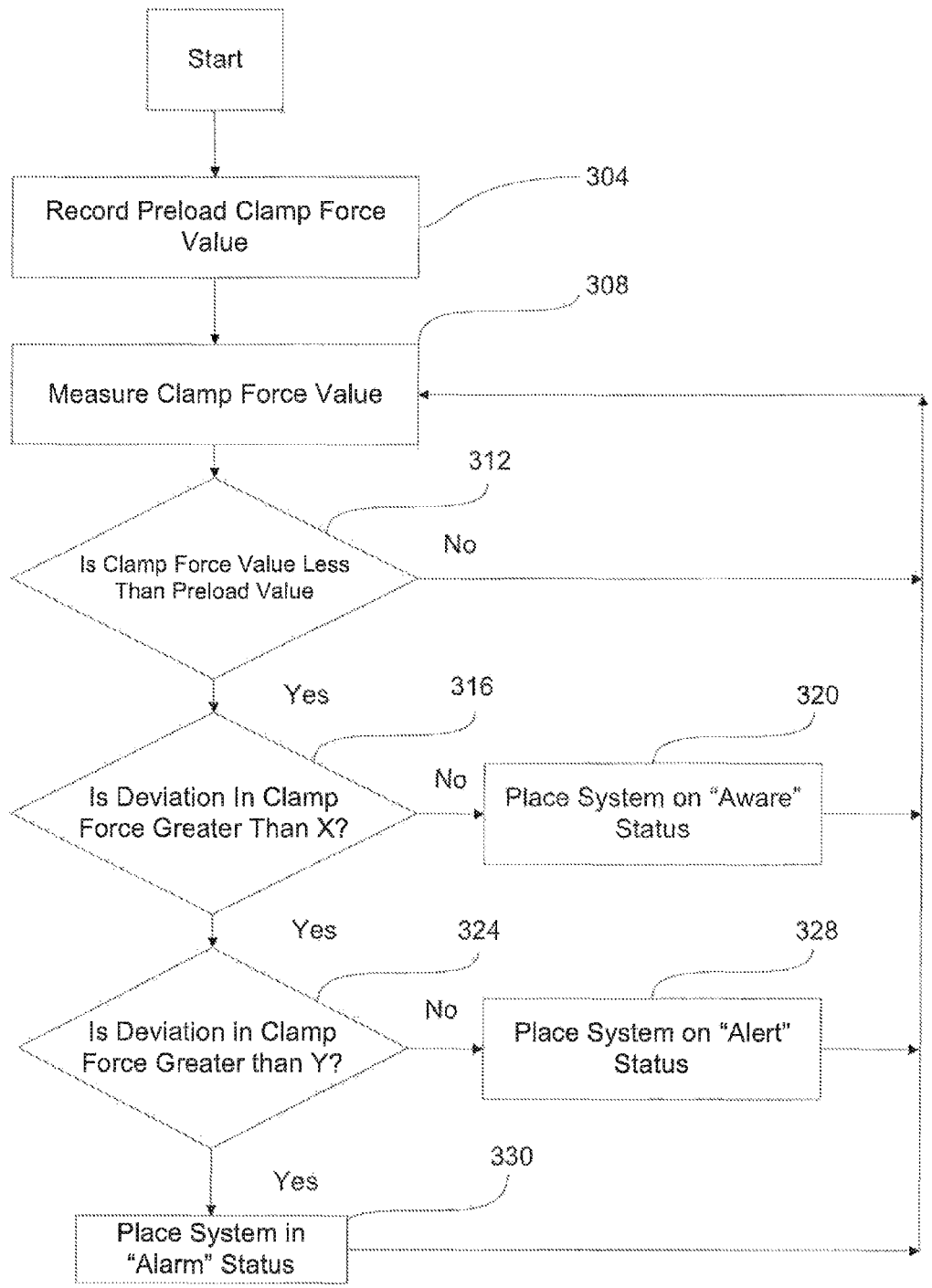
FIG. 3 is a block diagram depicting the steps used in a software program for evaluating information from a clamping force sensor according to an embodiment of the present invention.

FIG. 3 shows an exemplary process 300 for monitoring a transformer, such as transformer 100 (FIG. 1), with monitoring system that can include sensor assembly 132 and related hardware and software that provides instructions to a grid operator based on clamping force value measurements. Software or firmware instructions for implementing the process illustrated in FIG. 3 may be executed by computing system 400, described more below and illustrated in FIG. 4. At step 304, a preload clamp force value corresponding to the pressure applied to the transformer windings is recorded. Typically, the preload clamp force is set within the windings by using hydraulic pressure and fixing the position of the end blocks with bolts or wedges after the transformer winding assembly is stabilized at a predetermined insulation dryness level. Assuring the proper dryness of the windings when applying the preload clamping force mitigates against a deviation from the original preload force when the transformer subsequently dries to a lower moisture level in the field.

At step 308, the clamping force value is measured by a sensor assembly, such as sensor assembly 132 (FIGS. 1 and 1A). The measurement of the clamping force value may occur periodically or may occur continuously so that events, such as short circuits, may be identified and their severity and duration documented.

At step 312, a determination is made as to whether the clamping force value has exceeded predetermined deviation parameters from the preload clamp force value. Alternatively or additionally, the process may also monitor for certain size deviations occurring over a set period of time. In either case, if the predetermined deviation parameters have not been exceeded, the process returns to step 308 where further measurements of the clamping force at taken. If the predetermined parameters are exceeded, the process continues to step 316.

At step 316, the extent of deviation is determined, which, for this embodiment, is a determination as to whether the clamping force value is a certain percentage greater than a minimum permissible clamp force (MPCF). An acceptable deviation may be said to occur if the clamping force value is, for example, greater than 115% of the MPCF. If this type of deviation has occurred, the process can proceed to step 320 where the system is placed on "Aware" status, which indicates that an excessive clamp force is being applied to the transformer windings and that precautionary measures may need to be taken. After setting the system on "Aware" status, the process returns to step 308 for continued measurement of the clamping force value. If the deviation is less than 115% of MPCF, indicating a more significant deviation has occurred, then the process continues to step 324.

At step 324, a determination is made as to the amount of the drop, D, in the clamping force value, as different amounts of deviation may require different responses by an operator. Depending on the severity of the drop or the desires of the operator, the system may be placed in either "Alert" status at step 328 or "Alarm" status at step 332. "Alert" status can indicate, among other things, that precautionary measures should be taken, such as scheduling an outage for the transformer in order to readjust the clamping force. "Alarm" status can indicate, among other things, that the clamping force value has decreased below a predetermined level and/or that a significant drop in the clamping force value has increased the probability of failure of the transformer upon the occurrence of the next short-circuit event. In the current embodiment of process 300, the system is set to "Alarm" status if, at step 324, D is between a lower bound clamp force value, Y, and an upper bound clamp force value, Z. Regardless of the criteria used, after placing the system in a status, the process returns to step 308 to continue measuring the clamping force value on the transformer windings.

The system may be placed in "Alert" status based on a several different criteria. In an embodiment, if the measured clamp force value has fallen to less than a certain predetermined percentage of the MPCF, the system may be placed in "Alert" status at step 328. For example, the system may be placed on "Alert" status when the measured clamp force value has reduced to about less than 115% of the MPCF. In another embodiment, the system may be placed in "Alert" status if the measured clamp force value has fallen by a predetermined value of the MPCF over a predetermined period. For example, the system may be placed in "Alert" status if the measured clamp force value has fallen by about more than 5% in a one month of operation. Notably, in the latter case, a steep reduction in a relatively short amount of time may suggest to the operator that the reduction in clamping force may have occurred because of a short circuit fault and further investigation may be justified to determine if damage has occurred to the winding assembly. In yet another embodiment, the system may be placed in "Alert" status if any of the sensors located within the transformer measures a clamping force value that is less than a certain amount of a maximum measured clamping force value in any winding. For example, the system may be placed in "Alert" status if any of the sensors located within the transformers measures a clamping force value that is less than 85% of a maximum measured clamping force value in any winding. In the embodiment of process 300 shown in FIG. 3, the system is set to "Alarm" status if D, the drop in clamp force, is below the lower bound clamp force value, Y.

The system may also be placed in "Alarm" status based on predefined criteria. For example, if the clamping force value has dropped to a level equal to or less than the MPCF, the system may be placed in "Alarm" status. In another embodiment, the system may also be placed in "Alarm" status when a drop of clamping force value over a certain period exceeds a predetermined amount.

It is to be noted that any one or more of the aspects and embodiments of process 300 described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding for implementing process 300 may readily be prepared by skilled programmers based on the teachings of the present disclosure, as will be apparent to those of ordinary skill in the software art. Aspects and implementations of force monitoring system 128 discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
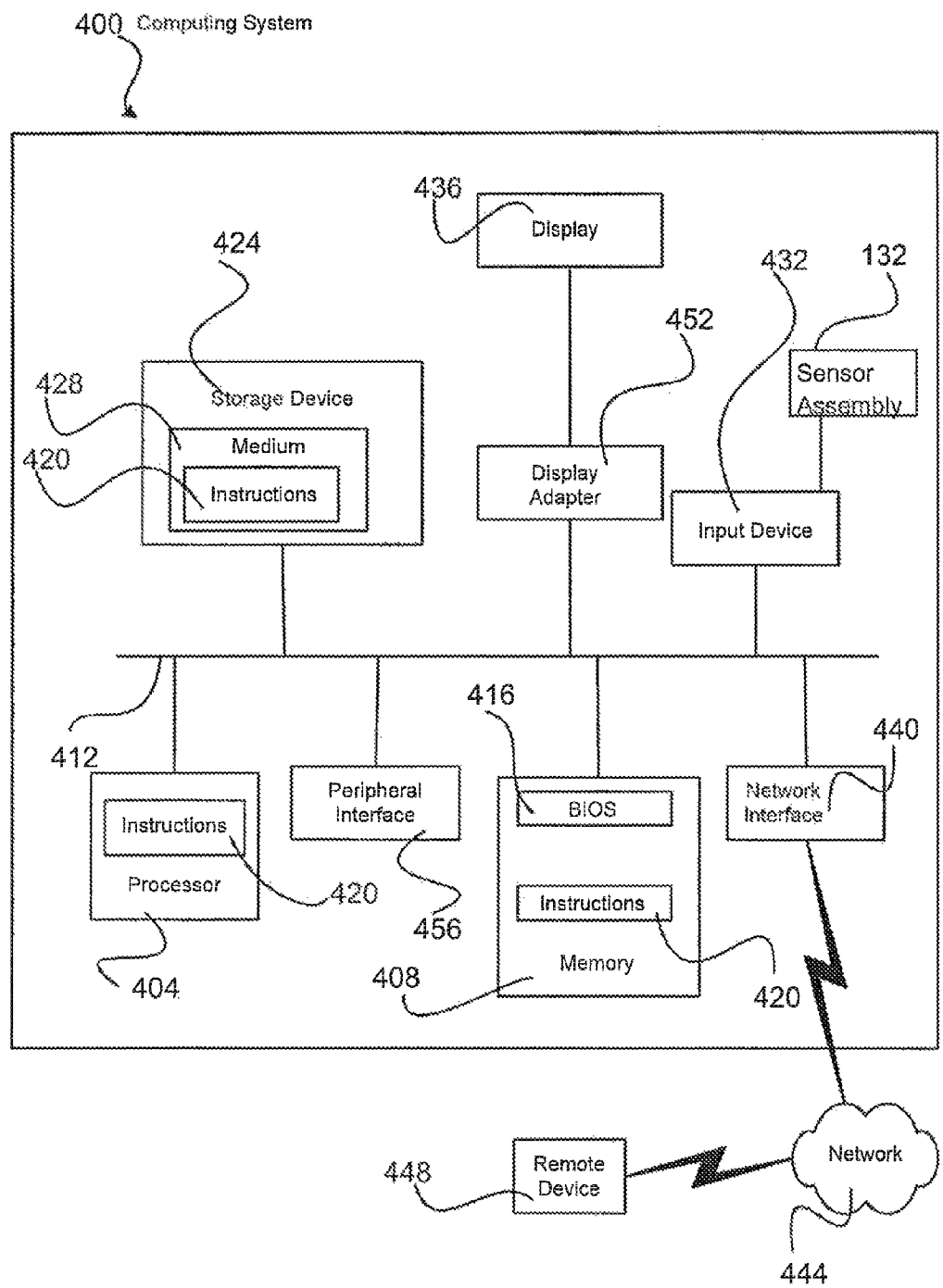
FIG. 4 is a block diagram of computing environment according to an embodiment of the present invention.

FIG. 4 shows a diagrammatic representation of one embodiment of a computing device in the exemplary form of a computer system 400 within which a set of instructions for causing a control system, such as monitoring system 128 of FIG. 1, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above. Input device 432 may also include sensor assembly 132, which provides the clamp force value measurements described above. The output of sensor assembly 132 can be stored, for example, in storage device 424 and can be further processed to provide, for example, analysis of the clamp force value over time, by processor 404.

A user may also input commands and/or other information to computer system 400 via storage device 424 (e.g., a removable disk drive, a flash drive, etc.) and/or network interface device 440. A network interface device, such as network interface device 440 may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide a graphical representation of a utility resource, a location of a land parcel, and/or a location of an easement to a user. In addition to a display device, a computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of determining a real time compression of windings within a transformer that is energized and under load comprising:
   measuring an initial compression force exerted on a clamping assembly with a clamping force sensor installed within the clamping assembly;
   determining a difference in compression force from the initial compression force;
   and
   indicating a status of the clamping assembly based on the difference in compression force.

2. A method according to claim 1, wherein said determining is based upon changes in the shape of a housing containing a fiber optic sensor.

3. A method according to claim 1, wherein said determining is completed in situ and during the operation of the transformer.

4. A method according to claim 1, further including determining the frequency of changes of compression force and indicating a status of the clamping assembly based upon said frequency of changes.

* * * * *